United States Patent
Berenbach et al.

(10) Patent No.: US 9,311,219 B2
(45) Date of Patent: Apr. 12, 2016

(54) AUTOMATIC TRACE RETRIEVAL USING SEMANTIC BRIDGE

(71) Applicant: Siemens Aktiengesellschaft, Munich (DE)

(72) Inventors: Brian Berenbach, Edison, NJ (US); Jane Cleland Huang, Flossmoor, IL (US); Marek Gibiec, Chicago, IL (US); Yonghee Shin, Chicago, IL (US); Yubin Li, Carpentersville, IL (US)

(73) Assignees: Siemens Aktiengesellschaft, Munich (DE); Marek Gibiec, Chicago, IL (US); Jane Cleland Huang, Flossmoor, IL (US); Yonghee Shin, Chicago, IL (US)

( * ) Notice: Subject to any disclaimer, the term of this patent is extended or adjusted under 35 U.S.C. 154(b) by 152 days.

(21) Appl. No.: 13/623,196

(22) Filed: Sep. 20, 2012

(65) Prior Publication Data
US 2013/0085971 A1    Apr. 4, 2013

Related U.S. Application Data

(60) Provisional application No. 61/540,566, filed on Sep. 29, 2011.

(51) Int. Cl.
*G06F 15/18*     (2006.01)
*G06F 11/36*     (2006.01)

(52) U.S. Cl.
CPC ........ *G06F 11/3636* (2013.01); *G06F 11/3604* (2013.01)

(58) Field of Classification Search
USPC ......................................................... 706/12
See application file for complete search history.

(56) References Cited

U.S. PATENT DOCUMENTS

| | | | | |
|---|---|---|---|---|
| 7,480,893 | B2 * | 1/2009 | Berenbach et al. | 717/104 |
| 7,822,741 | B2 * | 10/2010 | Sonkin et al. | 707/718 |
| 7,954,083 | B2 * | 5/2011 | Berenbach et al. | 717/105 |
| 7,986,656 | B2 * | 7/2011 | Li et al. | 370/328 |
| 8,015,550 | B2 * | 9/2011 | Berenbach et al. | 717/124 |
| 8,214,225 | B2 * | 7/2012 | Rao et al. | 705/2 |
| D685,072 | S  * | 6/2013 | Li et al. | D23/351 |

(Continued)

OTHER PUBLICATIONS

Research on Information Retrieval Based on Keywords Relationship and Past Retrieval Records in P2P Networks Xianfu Meng ; Yue Gong Network and Parallel Computing Workshops, 2007. NPC Workshops. IFIP International Conference on DOI: 10.1109/NPC.2007.112 Publication Year: 2007 , pp. 495-501.*

(Continued)

*Primary Examiner* — Michael B Holmes

(57) ABSTRACT

A method for performing automatic trace retrieval includes receiving a first and second model for a system or service (S10). The first model includes a first plurality of model artifacts at least partially represented by a first semantic style and the second model includes a second plurality of artifacts at least partially represented by a second semantic style. Training data including one or more correspondences between artifacts of the first plurality of model artifacts and artifacts of the second plurality of artifacts is collected. A semantic transformation table is generated for converting between the first and second semantic styles using the collected training data (S11). The generated semantic transformation table is used in tracing associations between artifacts of the first plurality of artifacts and artifacts of the second plurality of artifacts (S12).

20 Claims, 3 Drawing Sheets

(56) References Cited

U.S. PATENT DOCUMENTS 8,788,261 B2 * 7/2014 Sikstrom et al. .......... 704/9
2008/0059168 A1 * 3/2008 Eide ........................ 704/231

OTHER PUBLICATIONS

Using Semantics-Enabled Information Retrieval in Requirements Tracing: An Ongoing Experimental Investigation Mahmoud, A.; Nan Niu Computer Software and Applications Conference (COMPSAC), 2010 IEEE 34th Annual DOI: 10.1109/COMPSAC.2010.29 Publication Year: 2010, pp. 246-247.*

The Study on the Techniques on Gun-Dome Camera Cooperative Human-Tracing Zhiguo Yan; Kaili Gu Semantics, Knowledge and Grids (SKG), 2014 10th International Conference on DOI: 10.1109/SKG.2014.35 Publication Year: 2014, pp. 165-170.*

Toward an effective automated tracing process Mahmoud, A. Program Comprehension (ICPC), 2012 IEEE 20th International Conference on DOI: 10.1109/ICPC.2012.6240502 Publication Year: 2012, pp. 269-272.*

* cited by examiner

AUTOMATIC TRACE RETRIEVAL USING SEMANTIC BRIDGE

CROSS-REFERENCE TO RELATED APPLICATION

The present application is based on provisional application Ser. No. 61/540,566, filed Sep. 29, 2011, the entire contents of which are herein incorporated by reference.

TECHNICAL FIELD

The present disclosure relates to trace retrieval and, more specifically, to automatic trace retrieval using semantic bridge.

DISCUSSION OF THE RELATED ART

Requirements engineering is an interdisciplinary field of engineering focusing on desired functions and constraints of complex combinations of systems and software. In requirements engineering, various factors and objectives are considered and tracked. Requirements engineering may be used to generate a requirements specification, which may be used by systems engineers to aid in design. Modeling is an important tool in requirements engineering. Modeling is the practice by which various aspects of a system may be captured and organized, for example, within a repository such as a database. For example, modeling may be used to capture and organize elements involved in designing a product or service. Within the model, multiple elements, which may be referred to as artifacts, are included and relationships between artifacts are represented.

One example of an artifact that may be included within a model is the requirement. Requirements are artifacts that represent any constraint on the product or service under design that may be dictated by contractual, obligation, regulatory oversight, physical and/or natural limitation, industry standards, quality standards, etc.

Another example of an artifact that may be included within a model is the feature. Features are artifacts that represent characteristics of the system that distinguish it from other systems. Unlike other objects, or to an extent greater than for other objects, features may be those characteristics that customers or marketers use to distinguish competing products in the marketplace. Accordingly, features objects may have an indirect or direct relationship with one or more stakeholders within the model.

Many other artifact types exist and are in widespread use in the field of requirements engineering.

As modern systems under design may be extraordinarily complex, a single system or various aspects of a system may be modeled within different models. For example, some models may express regulatory factors while other models may express design factors.

Determining correspondence between artifacts, either within a single model or between different models, is known as tracing. A result of tracing may be the establishment of trace links that may express the correspondence between artifacts. Generating trace links automatically is known as trace retrieval. A model for which trace links exist may be considered to have traceability, as once trace retrieval has been performed, traces exist between related artifacts and it is possible for these traces to be used to better appreciate relationships between artifacts.

While many different types of correspondences may be represented within a model, two general categories of correspondences include dependencies, which signifies that one artifact is dependent upon the other, and associations, which signifies a general relationship between the two artifacts.

One common example of related artifacts is the linking of product features to specific regulatory requirements. In fact, many governmental agencies now impose traceability requirements. For example, the U.S. Food and Drug Administration (FDA) states that traceability analysis must be used to verify that the software design implements all of the specified software requirements, that all aspects of the design are traceable to software requirements, and that all code is linked to established specifications and test procedures. Similarly, the Federal Aviation Administration (FAA) has established standard DO-178B as the accepted means of certifying all new aviation software. This standard specifies that at each and every stage of development, "software developers must be able to demonstrate traceability of designs against requirements." Furthermore, standard software process initiatives adopted by many organizations, such as CMMI, require similar traceability practices. Traceability is therefore broadly recognized as an important factor in building rigorous software intensive systems, especially embedded systems which are frequently considered safety critical.

However, ensuring traceability between artifacts of different models may present a particular difficulty. The terminology used by different people may differ significantly between models. For example, a person concerned with regulatory compliance may utilize one manner of description while a person concerned with computer programming may utilize another manner of description. Additionally, people located in different geographic regions may tend to use different words, even where only a single language is used. Accordingly, it is often difficult to use automated techniques to determine correspondences of artifacts between distinct but related models.

SUMMARY

A method for performing automatic trace retrieval includes receiving a first model for a system or service. The first model includes a first plurality of model artifacts at least partially represented by a first semantic style. A second model for the system or service is received. The second model includes a second plurality of artifacts at least partially represented by a second semantic style. Training data including one or more correspondences between artifacts of the first plurality of model artifacts and artifacts of the second plurality of artifacts is collected. A semantic transformation table is generated for converting between the first and second semantic styles using the collected training data. The generated semantic transformation table is used in tracing associations between artifacts of the first plurality of artifacts and artifacts of the second plurality of artifacts.

The first semantic style may include language for describing a regulatory environment and the second semantic style may include language for describing a software programming environment. The first plurality of model artifacts may include regulatory requirements and the second plurality of model artifacts may include programming requirements.

The training data may further include modified trace queries. The one or more correspondences between artifacts of the first plurality of model artifacts and artifacts of the second plurality of artifacts may include a partial traceability matrix.

Generating a semantic transformation table may include using computer learning techniques to generate a thesaurus of corresponding terms from the collected one or more correspondences between artifacts of the first plurality of model artifacts and artifacts of the second plurality of artifacts.

Generating a semantic transformation table may include joining artifacts from the first and second pluralities of model artifacts, employing association rule mining to detect co-occurrences within the joined artifacts, establishing transformation rules from the association rule mining, and filtering the established transformation rules to remove invalid rules.

Using the generated semantic transformation table in tracing associations between artifacts of the first plurality of artifacts and artifacts of the second plurality of artifacts may include using the generated semantic transformation table to modify traceability queries.

Using the generated semantic transformation table in tracing associations between artifacts of the first plurality of artifacts and artifacts of the second plurality of artifacts may include converting the second model into the first semantic style. Using the generated semantic transformation table in tracing associations between artifacts of the first plurality of artifacts and artifacts of the second plurality of artifacts may include converting the second model into the first semantic style and employing an automated traceability technique to trace artifact associations between the first and second models.

A method for performing automatic trace retrieval includes receiving a first model for a system or service. The first model includes a first plurality of model artifacts at least partially represented by a first semantic style. A second model for the system or service is received. The second model includes a second plurality of artifacts at least partially represented by a second semantic style. One or more manually input correspondences between artifacts of the first plurality of model artifacts and artifacts of the second plurality of artifacts are collected. Artifacts of the first and second plurality of model artifacts are joined. Association rule mining is employed to detect co-occurrences within the joined artifacts. Transformation rules are established from the association rule mining. The established transformation rules are filtered to remove invalid rules. The filtered transformation rules are used in tracing associations between artifacts of the first plurality of artifacts and artifacts of the second plurality of artifacts.

The first semantic style may include language for describing a regulatory environment and the second semantic style may include language for describing a software programming environment. The first plurality of model artifacts may include regulatory requirements and the second plurality of model artifacts may include programming requirements.

The one or more manual correspondences between artifacts of the first plurality of model artifacts and artifacts of the second plurality of artifacts may include a partial traceability matrix.

Using the filtered transformation rules in tracing associations between artifacts of the first plurality of artifacts and artifacts of the second plurality of artifacts may include using the filtered rules to modify traceability queries.

Using the filtered transformation rules in tracing associations between artifacts of the first plurality of artifacts and artifacts of the second plurality of artifacts may include using the filtered transformation rules to convert the second requirements model into the first semantic style.

Using the filtered transformation rules in tracing associations between artifacts of the first plurality of artifacts and artifacts of the second plurality of artifacts may include converting the second model into the first semantic style and employing an automated traceability technique to trace artifact associations between the first and second models.

A computer system includes a processor and a non-transitory, tangible, program storage medium, readable by the computer system, embodying a program of instructions executable by the processor to perform method steps for performing automatic trace retrieval. The method includes receiving a first model for a system or service. The first model includes a first plurality of model artifacts at least partially represented by a first semantic style. A second model for the system or service is received. The second model includes a second plurality of artifacts at least partially represented by a second semantic style. Training data including one or more correspondences between artifacts of the first plurality of model artifacts and artifacts of the second plurality of artifacts is collected. A semantic transformation table for converting between the first and second semantic styles is generated using the collected training data. The generated semantic transformation table is used in tracing associations between artifacts of the first plurality of artifacts and artifacts of the second plurality of artifacts.

Generating a semantic transformation table may include joining artifacts from the first and second pluralities of model artifacts, employing association rule mining to detect co-occurrences within the joined artifacts, establishing transformation rules from the association rule mining, and filtering the established transformation rules to remove invalid rules.

Using the generated semantic transformation table in tracing associations between artifacts of the first plurality of artifacts and artifacts of the second plurality of artifacts may include converting the second model into the first semantic style and employing an automated traceability technique to trace artifact associations between the first and second models.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
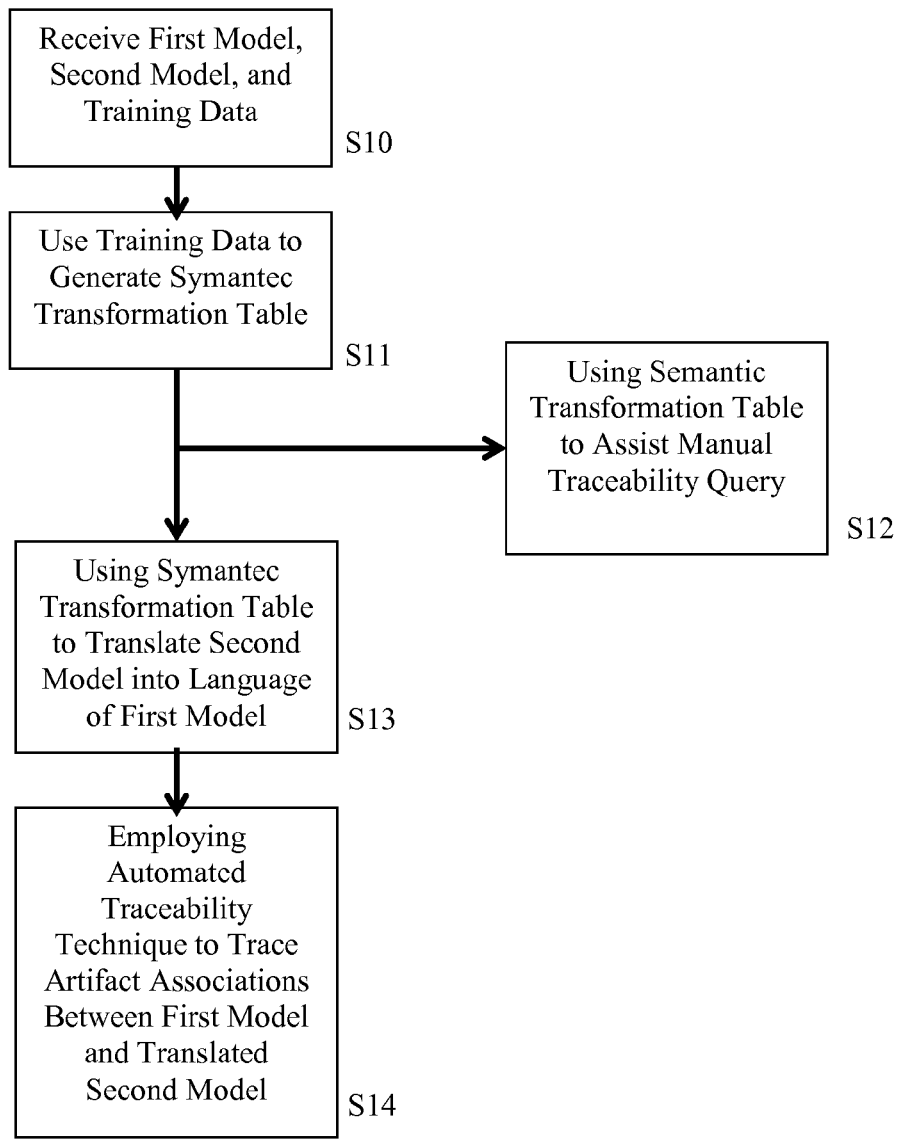
FIG. 1 is a flow chart illustrating an approach for automatic trace retrieval in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide various approaches for performing automatic trace retrieval between multiple models in which terminology used may be partially or entirely different from model to model. Exemplary embodiments of the present invention may inter-relate two distinct models by utilizing a semantic traceability bridge, which may be an automatically generated specialized thesaurus for matching terminology across models.

Core concepts and designs may be documented across multiple models, each of which might depict a single viewpoint or perspective of the system. For example, the system might include separate models for requirements, software components, electrical components, thermodynamics, and mechanical components. Furthermore, although each of these perspectives may be modeled separately in isolation from one another, they may interact to provide the behavior of the complete system. For example electronic sensors might monitor temperatures or fluid movements in a thermo-dynamic model, generate digitized messages that are processed by a software component to produce signals that control the behavior of mechanical components. In this type of complex mechatronics environments, changes in one part of the system can have significant and sometimes adverse impacts on other parts of the system.

By capturing dependencies and associations, for example, relationships such as "mitigates," "satisfies," "contributes," "tests," "implements," etc., across various models as traceability links, exemplary embodiments of the present invention may be used to support engineers as they evaluate the potential impact of proposed changes in requirements or in one of the design or simulation models. While traceability matrices may be manually generated and maintained, this task can add significant overhead to the project, and is therefore unlikely to be a viable option on the scale needed for effective traceability.

As used herein, a traceability link may be a specified association between a pair of artifacts, one comprising the source artifact and the other comprising the target artifact. The trace link may be a trace element and may be annotated to include information such as the link type and/or other semantic attributes. The trace link may have a primary direction for tracing; however, each trace link may be traversed in two directions so that each trace link is reversible. Some trace links may work the same way in both directions. These trace links may be referred to as an association.

FIG. 1 is a flow chart illustrating an approach for automatic trace retrieval in accordance with exemplary embodiments of the present invention. While many existing techniques for trace retrieval do not make use of training data, exemplary embodiments of the present invention may utilize training data in generating a semantic bridge and/or in applying other techniques for aiding in automatic trace retrieval by more closely aligning words and phrases used within various models. Accordingly, first, a first model, a second model and training data may be retrieved (Step S10). The first and second models may relate to a common project, such as a system under development, but each model may utilize a different vocabulary owing to the differing perspectives and/or locations of the people responsible for generating and maintaining the models. The training data may include the results of one or more manual traces performed by an expert user. The training data may, for example, be at least a partial traceability matrix. The training data may be created from manual traces performed either between the actual first and second models or from manual traces performed between two or more similarly styled models.

A traceability matrix, as used herein, may be a matrix recording traces comprising a trace relation. The trace matrix may show which pairs of trace artifacts are associated via trace links. For example, the trace matrix may be used to show links for requirements to code, laid out in a matrix (table) format.

The training data may then be used to automatically generate a semantic transformation table relating terminology between the two distinct models (Step S11). The semantic transformation table may be thought of as a semantic traceability bridge between the two models.

The generation of the semantic transformation table may be implemented using various computer learning techniques and algorithms. For example, exemplary embodiments of the present invention may utilize a modified Association Rule Mining algorithm to learn a set of Transformation Rules from the training data, which may include an initial set of traceability links.

For example, a blackboard architecture may be used to take various pieces of evidence into consideration while constructing the Semantic Traceability Bridge. Blackboard components may include: (1) a standard thesaurus that identifies obvious synonyms across models, and (2) a set of transformation rules. The transformation rules may allow for the automatic extraction of associations from the initial set of traceability links, e.g., the training data. For example, an FP-Growth algorithm may be modified to learn a set of query transformation rules. However, the query transformation problem differs in several primary respects from typical association rule mining. First, whereas association rule mining is concerned with discovering patterns of co-occurrence, the query transformation problem is concerned with discovering patterns of transformation. For example, instead of discovering that terms a and b co-occur in a single transaction, exemplary embodiments of the present invention are interested in discovering that when term a occurs in the source of a trace, then term b occurs in the target.

After the semantic transformation table has been generated, it may be used to assist in the manual execution of trace queries (Step S12). For example, a user may execute one or more trace query and the terminology of one model may be transformed into the terminology of the other model to improve the rate of success and/or to advance better results to higher prominence.

Alternatively, or additionally, the semantic transformation table may be used to transform the terminology of one table into the other (Step S13) either prior to or while an automated traceability tool is used to trace artifact associations between models (Step S14). Suitable traceability tools may be based on Vector Space Model (VSM), Latent Semantic Analysis, or the Probabilistic Network model (PN). These tools may compute the likelihood of a link based on the occurrence and distribution of terms. A similarity score may be calculated based upon the frequency and distribution of terms in the artifacts. Both the PN and VSM algorithms belong to a family of information retrieval methods known as TF-IDF (term frequency-inverse document frequency) that considers rarer terms to be stronger indicators of a potential link than more common ones.

Without the use of the semantic transformation table, these and similar tools frequent mismatch in terminology may reduce the effectiveness of the trace retrieval process. However, where the semantic transformation table is used, accuracy may be significantly increased.

Figure 2:
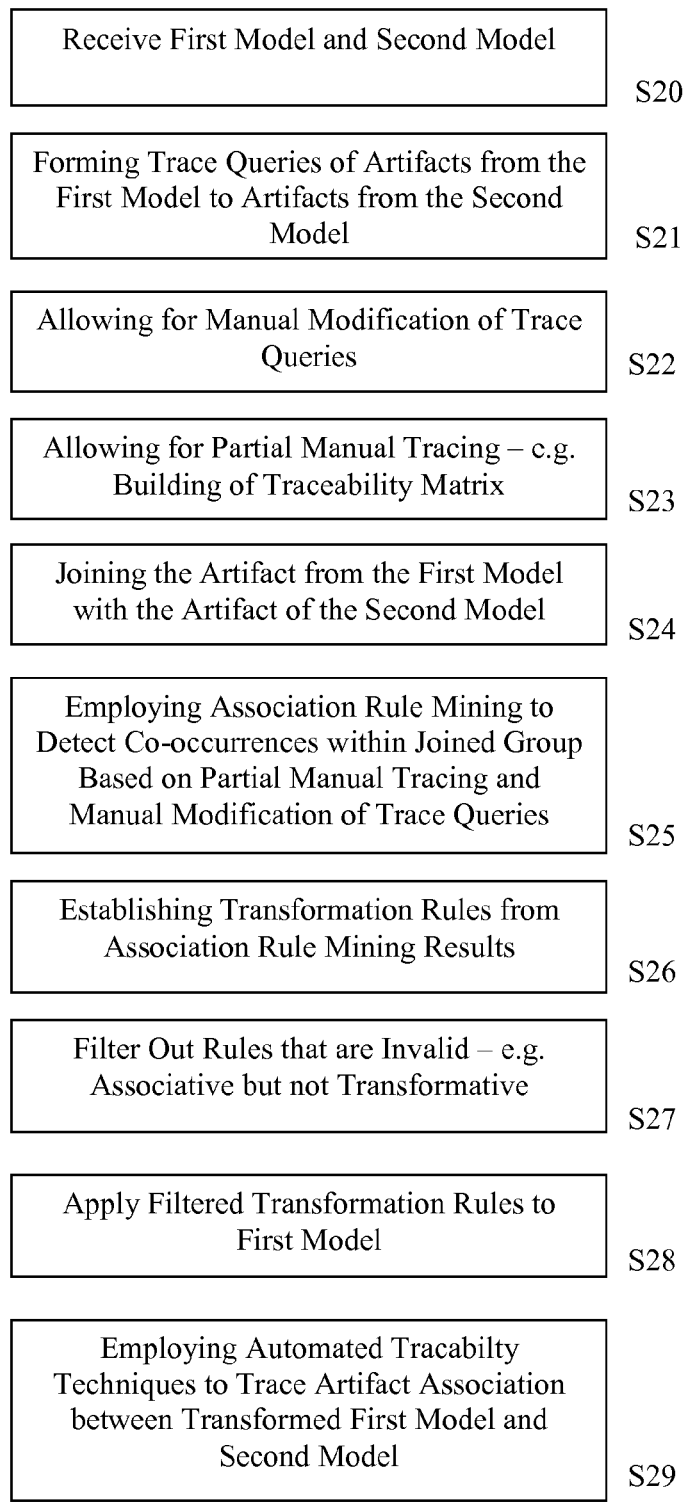
FIG. 2 is a second flow chart illustrating an approach for automatic trace retrieval in accordance with exemplary embodiments of the present invention.

FIG. 2 is a flow chart illustrating an approach for automatic trace retrieval in accordance with exemplary embodiments of the present invention. This approach may be performed in combination with one or more steps discussed above with respect to FIG. 1 and conversely, one or more steps of this approach may be performed in combination with the approach discussed above.

A first and second model may be retrieved (Step S20). Retrieval of the models may be performed by loading existing models from a database and/or retrieval of the models may involve the generation of new models. A user may then manually form one or more trace queries in an effort to trace a relationship between an artifact from the first model to the second model (Step S21). The formation of the trace query may include the identification of a source artifact from the first model and a request that a target artifact be found from the second model.

Alternatively, the one or more trace queries may be automatically generated, for example, by using a search algorithm such as the Vector Space Model to workthrough each artifact of the first model in an attempt to find related artifacts in the second model. Where trace queries are automatically generated, the user may be provided with the ability to manually modify the trace queries (Step S22). Manual modification to the trace queries may be used to provide more meaningful results.

The manual traces and/or manually modified traces may be used to build a partial traceability matrix (Step S23). The partial traceability matrix may represent one or more traces of relationships between artifacts of the first model and related artifacts of the second model. They may include, for example, a source artifact of the first model, a target artifact of the second model, and a description of the particular relationship between the artifacts.

Next, the training data, for example, including the partial traceability matrix and/or the modified trace queries may be used to learn a set of transformation rules. Exemplary embodiments of the present invention may utilize association rule mining techniques to aid in this endeavor; however, association rule mining techniques are designed to find co-occurrence and not dependency. Thus exemplary embodiments of the present invention use a special process for adapting the association rule mining techniques for this desired purpose. This may start with a joining of the artifacts from the first model with the artifacts of the second model (Step S24), in the combinations found to be related within the training data. For example, where the training data reveals that (a,b) of the first model traces to (a,c,d) of the second model, all artifacts may be joined as a combined set. While any notation for expressing the combined set may be used, an example of a suitable notation may be to express the combined set as (a,−b,+c,+d) as this combined set expresses the transformation of the link from the first model to the second.

Association rule mining approaches may then be applied to the combined sets to detect co-occurrence (Step S26). For example, in the example provided, association rule mining approaches may reveal that the artifact "a" is associated with −b, +c, and +d. This may, with suitable support from other combined sets, lead to a transformation rule that when a is found in the first model, b should be removed and c and d added to transform the expression to the context of the second model. As a single co-occurrence may not be sufficient to establish a relationship, exemplary embodiments of the present invention may utilize a measure of association provided by the association rule mining techniques, to determine when artifacts are sufficiently correlated. In the simplest context, this may be to set a threshold for the correlation score provided by the association algorithm in use.

However, because association rule mining approaches will detect co-occurrence rather than correspondence, many of the rules generated with this approach may simply indicate that various artifacts co-occur within the same model. For example, a combined set may be expressed as (a, b, c) which would indicate that in the first model, a commonly co-occurs with b and c. The resulting rule would therefore not be transformative and may be treated herein as invalid. Accordingly, exemplary embodiments of the present invention may filter out generated rules that are invalid, for example, for not being transformative, but rather, only serving to illustrate co-occurrence within a single model (Step S27).

Once the full set of filtered transformation rules have been created based on the training data, the rules may be used to aid in traceability. In one example, the set of filtered rules may constitute a semantic transformation table as the rules may transform a phrase of one or more words into a new sequence of one or more words. However, the set of rules so created may be more sophisticated than a simple semantic transformation table as the rules may add or remove words based on the presence of other words rather than simply converting some words to other words.

Thus the set of filtered rules may either be expressed as a semantic transformation table or as a more complex set of transformative relationships. In either event, the output may then be used to aid in traceability. For example, the rules may be used to convert the terminology of one model into the terminology of the other model (Step S28) and thereafter, approaches for automated traceability may be employed on the two models, now in a common terminology (Step S29).

Alternatively, the set of filtered rules may be used to transform source artifacts and use the transformed source artifacts in trace queries.

Alternatively, or additionally, the set of filtered rules may simply be used to generate a semantic transformation table or a thesaurus for use in interpreting models or for any other suitable purpose.

Figure 3:
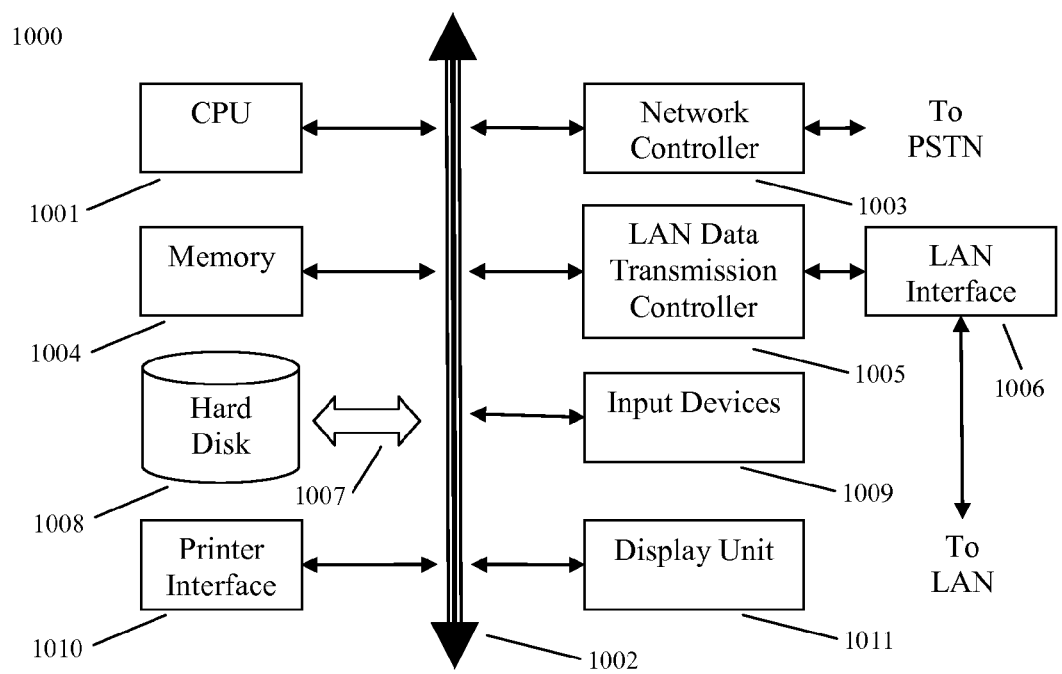
FIG. 3 shows an example of a computer system capable of implementing the method and apparatus according to embodiments of the present disclosure.

FIG. 3 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for performing automatic trace retrieval, comprising:
    receiving a first model for a system or service, the first model including a first plurality of model artifacts at least partially represented by a first semantic style;
    receiving a second model for the system or service, the second model including a second plurality of artifacts at least partially represented by a second semantic style;
    collecting training data including one or more correspondences between artifacts of the first plurality of model artifacts and artifacts of the second plurality of artifacts;

generating a semantic transformation table for converting between the first and second semantic styles using the collected training data; and using the generated semantic transformation table in tracing associations between artifacts of the first plurality of artifacts and artifacts of the second plurality of artifacts, wherein using the generated semantic transformation table in tracing associations between artifacts of the first plurality of artifacts and artifacts of the second plurality of artifacts includes converting the second model into the first semantic style.

2. A method for performing automatic trace retrieval, comprising:

receiving a first model for a system or service, the first model including a first plurality of model artifacts at least partially represented by a first semantic style;

receiving a second model for the system or service, the second model including a second plurality of artifacts at least partially represented by a second semantic style;

collecting training data including one or more correspondences between artifacts of the first plurality of model artifacts and artifacts of the second plurality of artifacts;

generating a semantic transformation table for converting between the first and second semantic styles using the collected training data and using the generated semantic transformation table in tracing associations between artifacts of the first plurality of artifacts and artifacts of the second plurality of artifacts, wherein the first semantic style includes language for describing a regulatory environment and the second semantic style includes language for describing a software programming environment.

3. The method of claim 1, wherein the first plurality of model artifacts includes regulatory requirements and the second plurality of model artifacts includes programming requirements.

4. A method for performing automatic trace retrieval, comprising:

receiving a first model for a system or service, the first model including a first plurality of model artifacts at least partially represented by a first semantic style;

receiving a second model for the system or service, the second model including a second plurality of artifacts at least partially represented by a second semantic style;

collecting training data including one or more correspondences between artifacts of the first plurality of model artifacts and artifacts of the second plurality of artifacts;

generating a semantic transformation table for converting between the first and second semantic styles using the collected training data and using the generated semantic transformation table in tracing associations between artifacts of the first plurality of artifacts and artifacts of the second plurality of artifacts, wherein the training data further includes modified trace queries.

5. The method of claim 1, wherein the one or more correspondences between artifacts of the first plurality of model artifacts and artifacts of the second plurality of artifacts comprises a partial traceability matrix.

6. The method of claim 1, wherein generating the semantic transformation table comprises using computer learning techniques to generate a thesaurus of corresponding terms from the collected one or more correspondences between artifacts of the first plurality of model artifacts and artifacts of the second plurality of artifacts.

7. The method of claim 1, wherein generating the semantic transformation table comprises:

joining artifacts from the first and second pluralities of model artifacts;

employing association rule mining to detect co-occurrences within the joined artifacts;

establishing transformation rules from the association rule mining; and filtering the established transformation rules to remove invalid rules.

8. The method of claim 1, wherein using the generated semantic transformation table in tracing associations between artifacts of the first plurality of artifacts and artifacts of the second plurality of artifacts includes using the generated semantic transformation table to modify traceability queries.

9. The method of claim 1, wherein using the generated semantic transformation table in tracing associations between artifacts of the first plurality of artifacts and artifacts of the second plurality of artifacts includes employing an automated traceability technique to trace artifact associations between the first and second models.

10. A method for performing automatic trace retrieval, comprising:

receiving a first model for a system or service, the first model including a first plurality of model artifacts at least partially represented by a first semantic style;

receiving a second model for the system or service, the second model including a second plurality of artifacts at least partially represented by a second semantic style;

collecting one or more manually input correspondences between artifacts of the first plurality of model artifacts and artifacts of the second plurality of artifacts;

joining artifacts of the first and second plurality of model artifacts;

employing association rule mining to detect co-occurrences within the joined artifacts;

establishing transformation rules from the association rule mining;

filtering the established transformation rules to remove invalid rules; and using the filtered transformation rules in tracing associations between artifacts of the first plurality of artifacts and artifacts of the second plurality of artifacts.

11. The method of claim 10, wherein the first semantic style includes language for describing a regulatory environment and the second semantic style includes language for describing a software programming environment.

12. The method of claim 10, wherein the first plurality of model artifacts includes regulatory requirements and the second plurality of model artifacts includes programming requirements.

13. The method of claim 10, wherein the one or more manual correspondences between artifacts of the first plurality of model artifacts and artifacts of the second plurality of artifacts comprises a partial traceability matrix.

14. The method of claim 10, wherein using the filtered transformation rules in tracing associations between artifacts of the first plurality of artifacts and artifacts of the second plurality of artifacts includes using the filtered rules to modify traceability queries.

15. The method of claim 10, wherein using the filtered transformation rules in tracing associations between artifacts of the first plurality of artifacts and artifacts of the second plurality of artifacts includes using the filtered transformation rules to convert the second requirements model into the first semantic style.

16. The method of claim 10, wherein using the filtered transformation rules in tracing associations between artifacts of the first plurality of artifacts and artifacts of the second plurality of artifacts includes converting the second model into the first semantic style and employing an automated traceability technique to trace artifact associations between the first and second models.

17. A computer system comprising:
a processor; and
a non-transitory, tangible, program storage medium, readable by the computer system, embodying a program of instructions executable by the processor to perform method steps for performing automatic trace retrieval, the method comprising:
receiving a first model for a system or service, the first model including a first plurality of model artifacts at least partially represented by a first semantic style;
receiving a second model for the system or service, the second model including a second plurality of artifacts at least partially represented by a second semantic style;
collecting training data including one or more correspondences between artifacts of the first plurality of model artifacts and artifacts of the second plurality of artifacts;
generating a semantic transformation table for converting between the first and second semantic styles using the collected training data; and
using the generated semantic transformation table in tracing associations between artifacts of the first plurality of artifacts and artifacts of the second plurality of artifacts,
wherein generating the semantic transformation table comprises using computer learning techniques to generate a thesaurus of corresponding terms from the collected one or more correspondences between artifacts of the first plurality of model artifacts and artifacts of the second plurality of artifacts.

18. The computer system of claim 17, wherein generating the semantic transformation table comprises:
joining artifacts from the first and second pluralities of model artifacts;
employing association rule mining to detect co-occurrences within the joined artifacts;
establishing transformation rules from the association rule mining; and
filtering the established transformation rules to remove invalid rules.

19. The computer system of claim 17, wherein using the generated semantic transformation table in tracing associations between artifacts of the first plurality of artifacts and artifacts of the second plurality of artifacts includes converting the second model into the first semantic style.

20. The computer system of claim 17, wherein using the generated semantic transformation table in tracing associations between artifacts of the first plurality of artifacts and artifacts of the second plurality of artifacts includes employing an automated traceability technique to trace artifact associations between the first and second models.

* * * * *